United States Patent [19]
Hunkele et al.

[11] Patent Number: 6,110,366
[45] Date of Patent: Aug. 29, 2000

[54] ANCHOR FOR AN UNDERDRAIN BLOCK

[75] Inventors: Gary Hunkele, Midland, Pa.; Paul Knauff, Geneva, Ohio

[73] Assignee: Tetra Process Technologies, Tampa, Fla.

[21] Appl. No.: 09/311,013

[22] Filed: May 13, 1999

[51] Int. Cl.[7] .................................................. B01D 24/46
[52] U.S. Cl. ........................... 210/232; 210/275; 210/291; 210/293
[58] Field of Search .................... 210/232, 274, 210/275, 279, 293, 289, 291

[56] References Cited

U.S. PATENT DOCUMENTS

| | | |
|---|---|---|
| 3,956,134 | 5/1976 | Roberts . |
| 4,496,462 | 1/1985 | Steinkraus . |
| 4,619,765 | 10/1986 | Roberts . |
| 4,923,606 | 5/1990 | Gresh et al. ............................ 210/275 |
| 5,019,259 | 5/1991 | Hambley ................................ 210/274 |
| 5,108,627 | 4/1992 | Berkeible et al. ..................... 210/793 |
| 5,149,427 | 9/1992 | Brown et al. .......................... 210/274 |
| 5,156,738 | 10/1992 | Maxson ................................. 210/274 |
| 5,332,497 | 7/1994 | Shea et al. ............................ 210/274 |
| 5,462,664 | 10/1995 | Neuspiel .............................. 210/274 |
| 5,489,388 | 2/1996 | Brown et al. .......................... 210/794 |
| 5,639,384 | 6/1997 | Brown et al. .......................... 210/794 |
| 5,865,999 | 2/1999 | Shea et al. ............................ 210/289 |
| 5,916,104 | 6/1999 | Lucenet et al. . |

FOREIGN PATENT DOCUMENTS

| | | |
|---|---|---|
| 1302745 | 11/1970 | Germany . |
| 2002251 | 2/1979 | United Kingdom . |

*Primary Examiner*—David A. Simmons
*Assistant Examiner*—Fred Prince
*Attorney, Agent, or Firm*—Jo Katherine D'Ambrosio

[57] ABSTRACT

A grout-gripping anchor for an underdrain block to be grouted to a filter floor is disclosed. Underdrain blocks have ribs extending outwardly from the exterior walls. The anchor is formed at the distant end of ribs positioned on the bottom exterior wall. The end of the rib widens to form one or more flanges or ledges so that grout covers the ledge when the underdrain block is grouted onto the filter floor. The anchor can be comprised of various shapes, including wedge-shape, rectangular shape or donut shaped.

17 Claims, 2 Drawing Sheets

ID BLOCK

FIELD OF THE INVENTION

The present invention relates to an anchor for an underdrain system, particularly to an anchor for securing an underdrain block to grout in a filter floor in an liquid treatment system.

BACKGROUND OF THE INVENTION

Water, wastewater and industrial liquid filtration units typically have an underdrain system for supporting filter media such that the filter media is spaced apart from the bottom of the filter. In addition to providing support for the filter media, the underdrain system serves two primary purposes: to collect the filtered water that passes through the media and to uniformly distribute backwash water, backwash air, or a combination of both, across the filter.

Underdrain systems are most often comprised of one of the following: precast concrete blocks, plastic-jacketed concrete blocks, stainless steel pipe laterals or screens, plastic nozzles or all plastic universal blocks. Universal blocks are widely accepted in the potable water market. They are called "universal" because they can provide both backwash water and backwash air for cleaning the filter media without additional piping across the filter floor. Universal blocks also allow for attachment of a retention cap which eliminates the need for gravel. The universal underdrain blocks are placed side-by-side and end-to-end in the bottom of the filter to provide a "false bottom." This type of underdrain block is always grouted to the filter floor.

During backwash operations, air is forced through the air distribution pipes and into the air laterals of the underdrain blocks. The pressurized air can be used as a backwash or combined with water for an air/water backwash. The pressurized air/water combination causes the filtered water to be passed upward through the media with sufficient velocity to prevent filter problems such as mud balls, filter cracking, agglomeration buildup on the media grains, and inactive areas within the filter.

One example of an underdrain system made of precast blocks is U.S. Pat. No. 4,923,606 to Gresh et al. Gresh teaches a precast concrete, plastic jacketed filter underdrain block for downflow or upflow filter units. The plastic jacket/molds are provided with alternating vertical ribs on the outside vertical surfaces. This creates an interlocking system whereby each block may be interconnected to adjacent side blocks. Laterally spaced legs are arranged to define a passage between the legs and extend from one end of the plastic block to the other end.

U.S. Pat. No. 5,160,614 to Brown discloses an underdrain system comprised of a series of modular, interconnected air duct blocks. In this reference, the row of air duct blocks extends transversely to a plurality of laterals. The laterals are defined by the connection of individual underdrain blocks in parallel adjacent rows.

U.S. Pat. No. 5,108,627 to Berkebile et al. disclose a filter underdrain block having a plurality of exterior and interior walls defining a plurality of interior chambers. Reinforcing ribs formed on the exterior surface of the walls may or may not extend the full length of the block. A plurality of spaced perpendicularly extending flange members 52 are provided along each sidewall above the position where the lower ribs terminate. These assist in handling and positioning the blocks along the bottom of the filter. The sidewall also comprises a plurality of indentations to facilitate intimate contact with grouting material when the block is assembled in a filter bed bottom. Col. 6, II. 56–65. The ribs extend around the lower portion of each block and rest on a previously constructed floor in a tank. Col. 7, II 68 -col. 8, I. 1. Reinforcing ribs formed on the exterior surface of the walls may or may not extend the full length of the block. A plurality of spaced perpendicularly extending flange members 52 are provided along each sidewall above the position where the lower ribs 20 terminate. These flange members 52 assist with handling and positioning of the blocks. Col.6, II. 56–61.

U.S. Pat. No. 5,865,999 to Shea et al. disclose a self-supporting underdrain member having a pair of flanges connected to inclined sidewalls. The flanges serve to attach the underdrain block to a filter floor surface. The disclosed underdrain block comprises a pair of generally triangular, transversely extending end walls. No bottom wall is provided in the underdrain block.

Plastic underdrain blocks are advantageously inexpensive to produce and efficient to operate but can cause severe problems. Unlike heavy-duty cement, plastic blocks tend to be buoyant when operating in the backwash mode, especially when high pressure air scouring is combined with water backwash. Typically, underdrain blocks are laid end to end and interlocked to form a 2–20 block lateral string that extends up to 60 feet. The blocks are snapped together end to end to form a tight seal. The lateral strings of blocks are then positioned side to side with an inch or inch and a half space between the parallel strings of blocks.

Grout is used both on the filter floor prior to placement of the blocks and then poured into the spaces between the lateral strings to hold the blocks in place as well as seal any openings or spaces. Leakage can cause the filter system to fail. Grouting helps to secure plastic underdrain blocks to the floor but, under current backwash systems, has not always been sufficient to withstand the pressure of the air/water backwash. Even when grouted to the filter floor, the beginning forces of the air/water backwash exceed the holding forces of the grout and can cause the buoyant underdrain block to pop out of the grout. When the underdrain block or, even worse, a string of interconnected blocks lift off the filter floor, gravel or plate media support systems can be thrown out of balance allowing media to clog the orifices of the piping and support system. If this occurs, the filter is ruined. Media and gravel must be removed and all underdrain blocks pulled out of the grout so that the filter can be rebuilt.

What is needed is a structure applicable to plastic underdrain blocks that provides additional resistance to the pressure of the backwash system. There is a need for a mechanism that retains the advantageous features of a plastic underdrain block, inexpensive manufacturing and efficiency, for example, without the disadvantage of buoyancy that lifts the block from the filter floor thereby disrupting filter operations.

SUMMARY OF THE INVENTION

The present invention comprises a grout-gripping anchor for a buoyant underdrain block. The anchor is especially applicable to plastic underdrain blocks because plastic blocks do not have the weight to counteract the pressure of the backwash system. The anchor of the present invention allows the user to retain the positive features of a plastic underdrain block, inexpensive manufacturing and efficiency for example, without experiencing the disadvantage of buoyancy that lifts the block from the filter floor thereby disrupting filter operations.

In a preferred embodiment, the present invention provides an anchor for an underdrain block to be grouted to a filter floor, the underdrain block has exterior walls including a top wall, side walls and a bottom wall connecting the side walls, the anchor comprising at least one rib extending from the bottom wall and away from the top wall; and one or more widenings extending outwardly from the rib on the bottom wall to form one or more ledges so that, in an installed position, grout covers the ledge when the underdrain block is grouted onto the filter floor. The expanded grouting area allows for additional grout to counteract the buoyancy forces occurring during backwash thereby reducing the tendency for the underdrain block to pop out of the grout when experiencing the high backwash pressures.

Preferably, the rib is integral with the bottom wall. Alternatively the rib is separate from the bottom wall. In one embodiment, the anchor is wedge-shaped. Alternatively, the anchor can be L-shaped or an inverted T-shape. In one preferred embodiment, the widening is donut-shaped. The widening can also be a flange.

Another preferred embodiment of the present invention comprises an underdrain system to be grouted to a filter floor, the underdrain system comprising: a plurality of exterior walls defining a hollow interior, the exterior walls forming a rectangular housing for an underdrain block, the exterior walls including a top wall and a bottom wall extending between a pair of side walls and the side walls extending between the top wall and the bottom wall; a plurality of interior walls defining at least two primary and two secondary distribution conduits; one or more ribs extending out from the exterior walls, one or widenings extending outwardly from the ribs located on the bottom wall so that a space is created between the widening and the bottom wall.

Preferably, the space between the widening and the bottom wall is grout-filled to anchor the underdrain block to the filter floor. In one preferred embodiment, the widening is wedge-shaped. Alternatively, the widening is L-shaped or an inverted T-shape.

An alternative embodiment comprises an underdrain system to be grouted to a filter floor, the underdrain system comprising: a plurality of exterior walls defining a hollow interior, the exterior walls including a top wall, a bottom wall and a pair of side walls extending between the top wall and the bottom wall; a plurality of interior walls defining at least two primary distribution conduits and two the secondary distribution conduits; one or more ribs extending outwardly from the exterior walls, the ribs having a near end adjacent the exterior wall and a far end, wherein the far end of the ribs located on the bottom wall are widened to form a ledge, wherein in an installed position grout covers the ledge thereby anchoring the underdrain system to the filter floor when the system is grouted.

In this embodiment, the rib has a first side and a second side and the far end of the rib is widened on both sides to form two ledges for receiving grout, the first ledge extending from the first side and the second ledge extending from the second side.

In an alternative aspect, the present invention comprises a filter media underdrain system comprising: a filter floor;a plurality of exterior walls defining a hollow interior, the exterior walls including a top wall, a bottom wall and a pair of side walls extending between the top wall and the bottom wall; a plurality of interior walls defining at least two primary distribution conduits and two the secondary distribution conduits; one or more ribs extending outwardly from the exterior walls, the ribs having a near end adjacent the exterior wall and a far end, wherein the far end of the ribs located on the bottom wall are widened to form a ledge, wherein in an installed position grout covers the ledge thereby anchoring the underdrain system to the filter floor when the system is grouted; and grout positioned below the bottom wall between the widening of the rib and the bottom wall for anchoring the underdrain system to the filter floor.

In an alternative anchor for an underdrain block to be grouted to a filter floor, the underdrain block having exterior walls including a top wall, side walls and a bottom wall connecting the side walls, the anchor comprises: at least one rib extending from the bottom wall and away from the top wall; the rib on the bottom wall defining one or more holes traversing the width of the rib; and an area of the rib circumscribing the hole forming a ledge so that, in an installed position, grout covers the ledge when the underdrain block is grouted onto the filter floor.

It is to be noted that the drawings illustrate only typical embodiments of the invention and are therefore not to be considered limiting of its scope, for the invention will admit to other equally effective embodiments.

DETAILED DESCRIPTION OF THE INVENTION

The present invention comprises an anchor extending from the bottom of an underdrain block used in liquid treatment filters, potable water filters, for example. When the potentially buoyant underdrain block, a plastic block for example, is positioned on the floor of the filter and grouted into place, the anchor is embedded in the grout. Once the grout hardens, the grout-gripping anchor provides a counterforce to the upward forces of the pressurized air/water backwash thereby inhibiting uplift of the underdrain blocks. The expanded grouting area results in improved performance of the grout. With the anchor of this invention, the grout secures the underdrain blocks to the filter floor with an increased resistant force to counteract the buoyancy forces occurring during backwash. The additional counteracting forces reduce the tendency for the underdrain block to pop out of the grout when experiencing the high-pressure backwash. The anchor is especially applicable to plastic underdrain blocks because plastic blocks do not have the weigh of concrete to counteract the pressure of the backwash system. The present invention allows the user to retain the advantageous features of a plastic underdrain block, inexpensive manufacturing and efficiency for example, without experiencing the disadvantage of buoyancy that lifts the block from the filter floor thereby disrupting filter operations.

Figure 1:
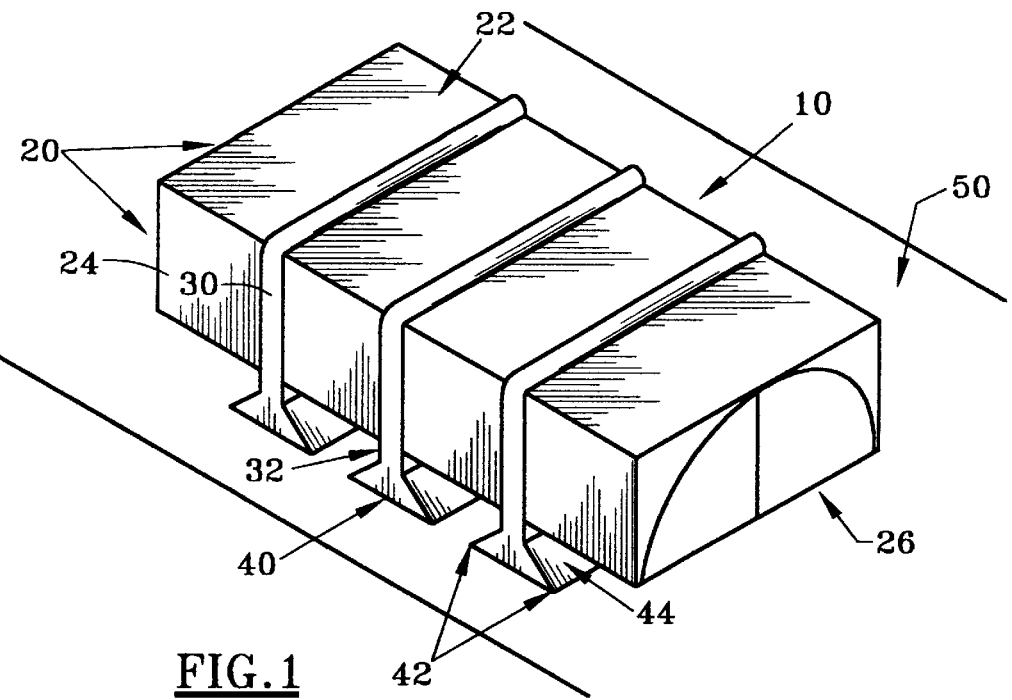
FIG. 1 is a three dimensional view of one embodiment of the present invention having ribs circumscribing the underdrain block.

Referring to FIG. 1, the underdrain block 10 has exterior walls 20 comprising a top wall 22, sidewalls 24 and a bottom wall 26. A plurality of ribs 30 are formed on the exterior walls 20. Ribs 30 provide structural strength for the underdrain block 10. The ribs 30 key into the grout and reinforce the block by providing additional surface for grouting. Ribs 30 also resist lateral movement of the block 10 in response to the forces of air/water pressurized backwash. Without the anchor 40 of the present invention, however, the ribs 30 (and block 10) can slip out of the grout when stressed by vertical forces created during high-pressure backwash.

Figure 3:
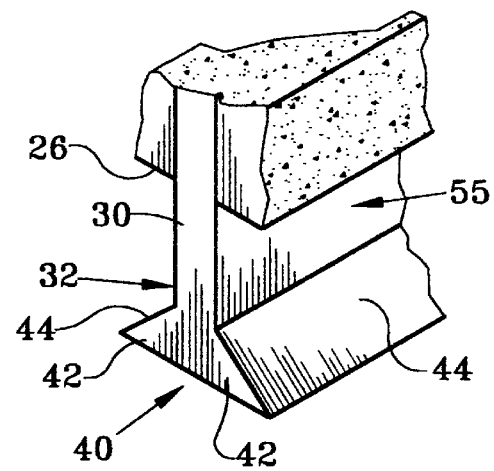
FIG. 3 is a three dimensional view of one embodiment of the anchor.

The ribs 30 can circumscribe the block 10 as illustrated in FIG. 1 and FIG. 3, or can partially surround the exterior walls 20 (not shown). The ribs 30 can be integral with the bottom exterior wall 26 or the ribs 30 can be formed as a separate structure and fixedly attached to the bottom wall 26. With either embodiment, the ribs 30 preferably extend at least across the bottom exterior wall 26 and up part of the sidewalls 24. In the area of the bottom exterior wall 26, the ribs 30 extend from the bottom wall 26 outwardly and away from the top wall 22. At the end of the rib 32 furthermost from the bottom exterior wall 26 and opposite of the top wall 22, the rib 30 widens to form the anchor 40 of the present invention. The anchor 40 comprises one or more widenings 42 extending outwardly from the rib 30 on the bottom wall 26 to form one or more ledges 44 so that grout flows over the ledges 44 when the underdrain block 10 is grouted to a filter floor 50. It is this additional surface for grouting that helps to counteract the buoyancy forces occurring during backwash thereby reducing the tendency for the underdrain block 10 to pop out of the grout when experiencing the high-pressure backwash.

Figures 2A, 2B, 2C, 2D:
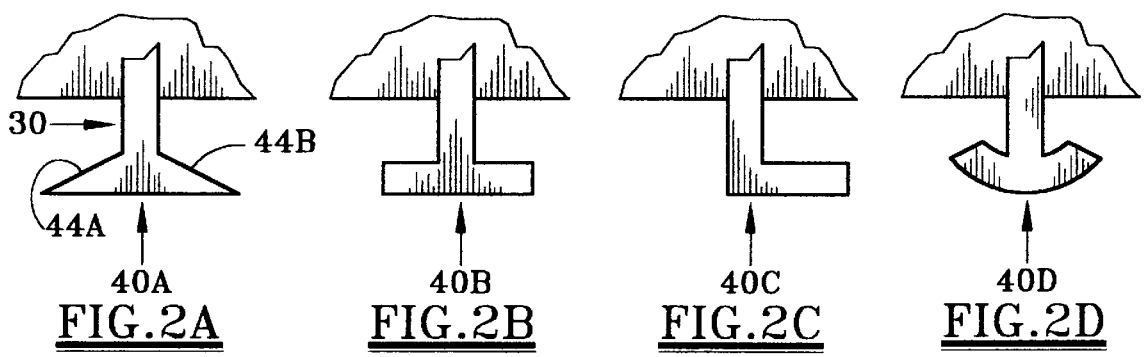
FIGS. 2A–2H illustrate the various shapes of the anchor of the present invention.

As shown in FIGS. 2A–2H, the widenings 42 of the rib 30 can take different shapes to form at least one flange or ledge 44. FIG. 2A depicts one preferred embodiment comprising a rib that widens into a wedge-shaped anchor 40a. The rib 30 extends outwardly from the bottom wall 26 and the end of the rib 32 widens to form two ledges 44a, 44b as illustrated by FIG. 3. The ledges 44a, 44b provide additional surface for grouting. In one preferred embodiment, the diameter of the rib 30 at a point immediately prior to widening into the anchor 40 ranges from about ⅛ inch to about ½ inch. Preferably the diameter of the rib 30 prior to widening is about ¼ inch. At the widest point of the anchor, the preferred width ranges from about 1/16 inch to about 1 inch. Preferably the widest point of the anchor is about ½ inch.

Figures 2E, 2F, 2G:
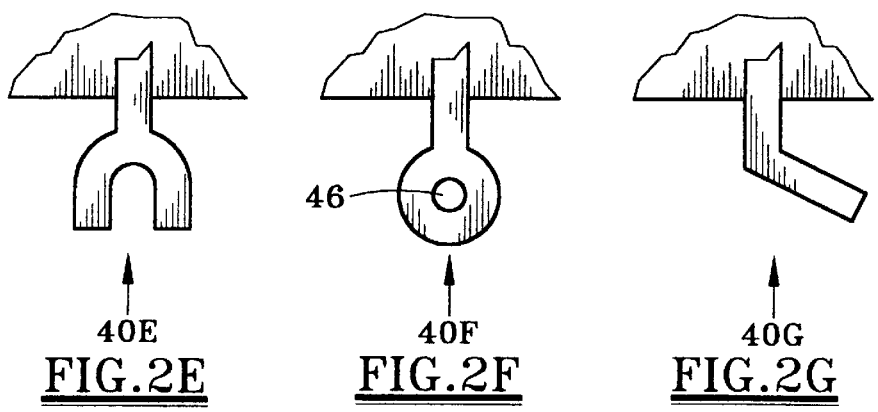

FIG. 2B illustrates an embodiment wherein the anchor 40b is rectangular-shaped. FIG. 2C shows an anchor 40c comprising one ledge perpendicular to the rib. FIG. 2G represents a single-ledge anchor 40g formed at an angle to the rib 30.

Figure 2H:
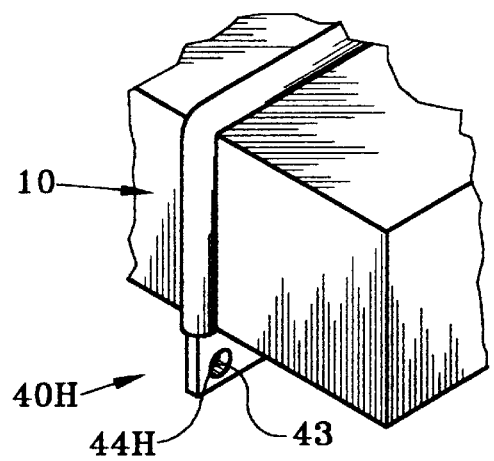

FIGS. 2D and 2E illustrate curved anchors 40d, 40e, specifically, u-shaped and inverted unshaped anchors 40d, 40e respectively. FIG. 2F depicts a widening 42f that defines a center hole 46 running along the longitudinal axis of the rib widening 42f. The anchor 40f of this embodiment is donut-shaped. In still another alternative embodiment as illustrated in FIG. 2H, the rib 30 extending from the bottom wall 26 defines holes 43 traversing the width of the rib 30h. In this embodiment of the anchor 40h, the ledge 44h is the edge of the rib circumscribing the hole 43. Other embodiments of the rib 30 can be envisioned to include a variety of shapes, which form an additional surface for grouting without departing from the scope of the invention.

Figure 4:
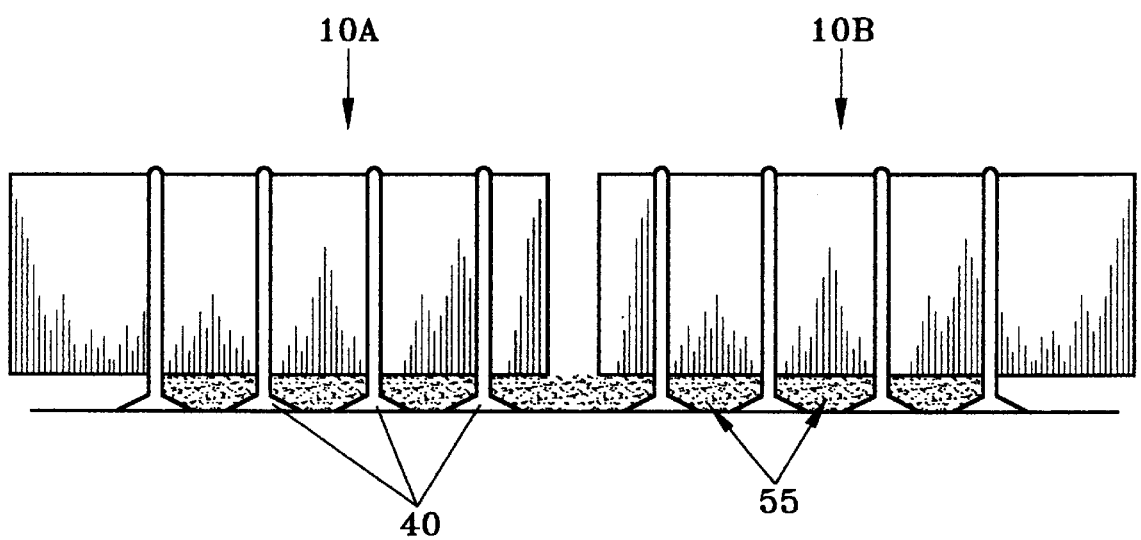
FIG. 4 is a cross-section of two underdrain blocks laid end to end.

During the construction of a filter, the filter floor 50 is grouted to receive the underdrain blocks 10. The underdrain blocks 10 are laid end-to-end on the filter floor 50 and interlocked to form a 2–20 block lateral string that extends up to about 60 feet. As illustrated in FIG. 4, the blocks 10 are snapped together end to end to form a tight seal. The lateral strings of blocks are then positioned side to side with an inch or inch and a half space between the parallel strings of blocks. In one embodiment, the underdrain block 10 may have lugs (not shown) on the sidewalls 24 to increase the surface area for grouting. Grout is used both on the filter floor prior to placement of the blocks 10 and then poured into the spaces between the lateral strings to hold the blocks 10 in place as well as seal any openings or spaces. As shown in FIG. 3 and FIG. 4, the grout surface area 55 under the underdrain block 10, 10a. 10b is expanded because of the ledges 44 created by the grout-gripping anchor 40.

The grout-gripping anchor 40 of this invention reduces the tendency of an underdrain block 10 or, worse, a lateral string of underdrain blocks, to lift off the filter floor because the extra grout surface area provides a gripping force that counteracts the upward forces created by the pressurized air/water backwash.

In one embodiment the underdrain block is made of plastic. The plastic is preferably high-density polyethylene. Alternatively, the plastic can be PVC. However, the underdrain block may comprise any material that is buoyant and tends to lift off the filter floor during air/water backwash. The anchor 10 of the present invention can be adapted to any underdrain block. The more common universal block has the following dimensions: about 10¼ inch width, about 12-inch height and about 36-inch length. The anchor, however, is especially efficient in low profile, plastic underdrain having the following dimensions: about 16¼ inch wide, about 8 inches high and about 36 inches long. Because the low profile blocks are shorter than the more common underdrain blocks they provide less sidewall area for grouting.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

What is claimed is:

1. An anchor for an underdrain block to be grouted to a filter floor, the underdrain block having exterior walls including a top wall, side walls and a bottom wall connecting the side walls, the anchor comprising:

at least one rib extending from the bottom wall and away from the top wall; and one or more widenings extending outwardly from the rib on the bottom wall to form one or more ledges so that, in an installed position, grout covers the ledge when the underdrain block is grouted onto the filter floor.

2. The anchor of claim 1 wherein the rib is integral with the bottom wall.

3. The anchor of claim 1 wherein the rib is separate from the bottom wall.

4. The anchor of claim 1 wherein the anchor is wedge-shaped.

5. The anchor of claim 1 wherein the anchor is L-shaped.

6. The anchor of claim 1 wherein the anchor has an inverted T-shape.

7. The anchor of claim 1 wherein the one or more widenings is donut-shaped.

8. The anchor of claim 1 wherein the one or more widenings is a flange.

9. An underdrain system to be grouted to a filter floor, the underdrain system comprising:

a plurality of exterior walls defining a hollow interior, the exterior walls forming a rectangular housing for an underdrain block, the exterior walls including a top wall and a bottom wall extending between a pair of side walls and the side walls extending between the top wall and the bottom wall;

a plurality of interior walls;

one or more ribs extending out from the exterior walls, and one or more widenings extending outwardly from the ribs located on the bottom wall so that a space is created between the one or more widenings and the bottom wall.

10. The underdrain system of claim 9 wherein the space between the one or more widenings and the bottom wall is grout-filled to anchor the underdrain block to the filter floor.

11. The underdrain system of claim 9 wherein the one or more widenings is wedge-shaped.

12. The underdrain system of claim 9 wherein the one or more widenings is L-shaped.

13. The underdrain system of claim 9 wherein the one or more widenings has an inverted T-shape.

14. An underdrain system to be grouted to a filter floor, the underdrain system comprising:

a plurality of exterior walls defining a hollow interior, the exterior walls including a top wall, a bottom wall and a pair of side walls extending between the top wall and the bottom wall;

a plurality of interior walls;

one or more ribs extending outwardly from the exterior walls, the ribs having a near end adjacent the exterior wall and a far end, wherein the far end of the ribs located on the bottom wall are widened to form a ledge, wherein in an installed position grout covers the ledge thereby anchoring the underdrain system to the filter floor when the system is grouted.

15. The underdrain system of claim 14 wherein the rib has a first side and a second side and the far end of the rib is widened on both sides to form two ledges for receiving grout, the first ledge extending from the first side and the second ledge extending from the second side.

16. A filter media underdrain system comprising:

a filter floor;

a plurality of exterior walls defining a hollow interior, the exterior walls including a top wall, a bottom wall and a pair of side walls extending between the top wall and the bottom wall;

a plurality of interior walls defining at least two primary distribution conduits and two the secondary distribution conduits;

one or more ribs extending outwardly from the exterior walls, the ribs having a near end adjacent the exterior wall and a far end, wherein the far end of the ribs located on the bottom wall are widened to form a ledge, wherein in an installed position grout covers the ledge thereby anchoring the underdrain system to the filter floor when the system is grouted; and grout positioned below the bottom wall between one or more widenings of the rib and the bottom wall for anchoring the underdrain system to the filter floor.

17. An anchor for an underdrain block to be grouted to a filter floor, the underdrain block having exterior walls including a top wall, side walls and a bottom wall connecting the side walls, the anchor comprising:

at least one rib extending from the bottom wall and away from the top wall;

the rib on the bottom wall defining one or more holes traversing the width of the rib;

and an area of the rib circumscribing the hole forming a ledge so that, in an installed position, grout covers the ledge when the underdrain block is grouted onto the filter floor.

* * * * *